US011618111B2

(12) United States Patent
Uozumi et al.

(10) Patent No.: US 11,618,111 B2
(45) Date of Patent: Apr. 4, 2023

(54) METHOD OF MANUFACTURING PLATE-SHAPED SOLDER AND MANUFACTURING DEVICE

(71) Applicant: Mitsubishi Electric Corporation, Tokyo (JP)

(72) Inventors: Shuji Uozumi, Tokyo (JP); Kazuhiko Sakutani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1062 days.

(21) Appl. No.: 16/302,189

(22) PCT Filed: Aug. 17, 2016

(86) PCT No.: PCT/JP2016/074018
§ 371 (c)(1),
(2) Date: Nov. 16, 2018

(87) PCT Pub. No.: WO2018/033975
PCT Pub. Date: Feb. 22, 2018

(65) Prior Publication Data
US 2019/0193212 A1    Jun. 27, 2019

(51) Int. Cl.
*B23K 35/00* (2006.01)
*B23K 35/40* (2006.01)
(Continued)

(52) U.S. Cl.
CPC .............. *B23K 35/40* (2013.01); *B21F 5/005* (2013.01); *B23K 3/0623* (2013.01);
(Continued)

(58) Field of Classification Search
CPC .................. B23K 35/40; B23K 3/0623; B23K 35/0222–0244; B23K 2101/40;
(Continued)

(56) References Cited

U.S. PATENT DOCUMENTS 1,873,847 A    8/1932    Miller
2,093,109 A *  9/1937    Huse ...................... B65D 33/00
                                                                  383/119
(Continued)

FOREIGN PATENT DOCUMENTS

DE    102020000913 A1 *  8/2021
EP        0027087 A1 *  4/1981
(Continued)

OTHER PUBLICATIONS

An Office Action mailed by the China National Intellectual Property Administration dated Jul. 3, 2020, which corresponds to Chinese Patent Application No. 201680088398.6 and is related to U.S. Appl. No. 16/302,189 with English language translation.
(Continued)

*Primary Examiner* — Kiley S Stoner
(74) *Attorney, Agent, or Firm* — Studebaker & Brackett PC

(57) ABSTRACT

A method of manufacturing a plate-shaped solder according to the invention of the present application includes an aggregating step of aggregating a plurality of thread solders and a crimping step of crimping the plurality of aggregated thread solders to one another to form a plate-shaped solder. A manufacturing device of a plate-shaped solder according to the invention of the present application includes an aggregating portion for aggregating a plurality of thread solders and a crimping portion for crimping the plurality of thread solders to one another in the aggregating portion to form a plate-shaped solder.

13 Claims, 4 Drawing Sheets

(51) Int. Cl.
*B21F 5/00* (2006.01)
*B23K 3/06* (2006.01)
*B23K 35/02* (2006.01)
*B23K 101/40* (2006.01)

(52) U.S. Cl.
CPC ...... *B23K 35/0233* (2013.01); *B23K 2101/40* (2018.08); *Y10T 29/49908* (2015.01)

(58) Field of Classification Search
CPC ... B23K 20/00; B23K 20/02–04; B21F 5/005; Y10T 29/49908
USPC .................................. 228/56.3, 235.1–235.3
See application file for complete search history.

(56) References Cited

U.S. PATENT DOCUMENTS

| | | | | |
|---|---|---|---|---|
| 2,344,457 | A * | 3/1944 | Christ | D04H 1/593 428/114 |
| 2,834,053 | A * | 5/1958 | Bilanin | D01D 5/0885 264/141 |
| 2,984,053 | A * | 5/1961 | Peterson | B24D 13/16 15/186 |
| RE25,582 | E * | 5/1964 | Davies | B24D 11/02 407/29.11 |
| 3,458,650 | A * | 7/1969 | Miyawaki | H01F 19/08 336/206 |
| 3,512,248 | A * | 5/1970 | Arpad | H01L 35/34 228/180.1 |
| 3,551,996 | A * | 1/1971 | Sumner et al. | B23K 20/2275 228/221 |
| 3,589,960 | A * | 6/1971 | Hood et al. | D07B 1/04 156/290 |
| 3,690,978 | A * | 9/1972 | Nishizawa et al. | D02G 3/328 156/244.11 |
| 3,737,979 | A * | 6/1973 | Rakich | B21B 1/0805 219/102 |
| 3,795,042 | A * | 3/1974 | Kreider | C22C 47/20 29/419.1 |
| 4,302,266 | A * | 11/1981 | Kutnyak | F16L 11/085 156/149 |
| 4,386,461 | A * | 6/1983 | Plummer | H01R 43/015 29/749 |
| 4,476,628 | A * | 10/1984 | Kees, Jr. | H01R 43/01 29/749 |
| 4,782,992 | A * | 11/1988 | Doble | B29C 53/566 29/419.1 |
| 4,798,932 | A * | 1/1989 | Dion | B23K 20/04 228/118 |
| 4,826,736 | A * | 5/1989 | Nakamura | C23C 28/023 148/903 |
| 4,886,108 | A * | 12/1989 | Utsunomiya | C22C 47/18 164/80 |
| 4,900,599 | A * | 2/1990 | Doble | C22C 47/20 428/614 |
| 5,010,642 | A * | 4/1991 | Takahashi | H01B 13/01254 29/745 |
| 5,042,711 | A * | 8/1991 | Iskenderian | B23K 20/04 219/102 |
| 5,612,129 | A * | 3/1997 | Karhuketo | B27N 3/06 428/221 |
| 5,975,177 | A * | 11/1999 | Petri | B29C 66/83413 52/717.06 |
| 6,386,426 | B1 | 5/2002 | Tadauchi et al. | |
| 6,428,522 | B1 * | 8/2002 | DiPalma | A61F 13/4702 604/385.01 |
| 6,524,292 | B1 * | 2/2003 | DiPalma | A61F 13/47263 604/385.12 |
| 6,610,038 | B1 * | 8/2003 | DiPalma | A61F 13/4702 604/385.12 |
| 6,695,828 | B1 * | 2/2004 | DiPalma | A61F 13/84 604/385.12 |
| 6,710,296 | B2 * | 3/2004 | Siedal | B23K 9/044 219/121.64 |
| 7,434,381 | B2 * | 10/2008 | Vaubourg | D07B 7/025 57/311 |
| 7,621,043 | B2 * | 11/2009 | Cote | H01L 21/56 29/846 |
| 8,999,081 | B2 * | 4/2015 | Willis | B23K 33/004 148/516 |
| 10,654,124 | B2 * | 5/2020 | Mennucci | B32B 15/012 |
| 10,814,428 | B2 * | 10/2020 | Konitzer | B33Y 30/00 |
| 2002/0174945 | A1 * | 11/2002 | Fair | B21F 33/007 156/169 |
| 2004/0056071 | A1 * | 3/2004 | Pohlman | B23K 35/0238 228/175 |
| 2004/0217093 | A1 * | 11/2004 | Arai | B23K 26/0846 219/121.69 |
| 2005/0015978 | A1 * | 1/2005 | Andersen | D07B 7/025 29/868 |
| 2005/0194697 | A1 * | 9/2005 | Hasegawa | H05K 3/325 438/119 |
| 2011/0147438 | A1 | 6/2011 | Deppisch et al. | |
| 2017/0305128 | A1 * | 10/2017 | Kitzmiller | B32B 5/022 |

FOREIGN PATENT DOCUMENTS

| | | | | |
|---|---|---|---|---|
| JP | 56165587 | A * | 12/1981 | ......... B23K 35/0222 |
| JP | S61-108467 | A | 5/1986 | |
| JP | S61-269997 | A | 11/1986 | |
| JP | 01216830 | A * | 8/1989 | |
| JP | H5-160562 | A | 6/1993 | |
| JP | H6-132645 | A | 5/1994 | |
| JP | 2000340037 | A * | 12/2000 | |
| JP | 2004178924 | A * | 6/2004 | |

OTHER PUBLICATIONS

International Search Report issued in PCT/JP2016/074018; dated Nov. 22, 2016.
Written Opinion issued in PCT/JP2016/074018; dated Nov. 22, 2016.
Notification of Transmittal of The International Search Report and The Written Opinion of The International Searching Authority, or The Declaration issued in PCT/JP2016/074018 dated Nov. 22, 2016.
An Office Action mailed by the China National Intellectual Property Administration dated Mar. 23, 2021, which corresponds to Chinese Patent Application No. 201680088398.6 and is related to U.S. Appl. No. 16/302,189; with English language translation.

* cited by examiner

METHOD OF MANUFACTURING PLATE-SHAPED SOLDER AND MANUFACTURING DEVICE

FIELD

The present invention relates to a method of manufacturing a plate-shaped solder and a manufacturing device.

BACKGROUND

Patent Literature 1 discloses means for manufacturing a ribbon solder. In this manufacturing means, a thin solder wire is rolled into a thin ribbon-shaped one between a pair of rollers.

CITATION LIST

Patent Literature

[PTL 1] JP H06-132645 A

SUMMARY

Technical Problem

In a manufacturing process of a semiconductor module, a bonding material is supplied to a base material, such as a substrate or a lead frame. Next, a semiconductor chip is mounted on the bonding material. Examples of the bonding material include a solder material and resin paste. The bonding material is selected according to a chip specification. Solder materials tend to be used in a manufacturing process of power modules in consideration of reliability, heat dissipation and cost reduction. A chip mount method is an example of a method of mounting a semiconductor chip using a solder material. In the chip mount method, a semiconductor chip is first mounted on solid solder under room temperature. Next, the solder and the semiconductor chip are bonded to each other by a reflow device. In addition to this method, there is also a method for arranging a base material on a heat source and mounting a semiconductor chip after solder is melt.

The chip mount method is suitable for manufacturing large current and high voltage products in consideration of multichip mounting and stability of bonding. In general, a ribbon solder is often used as a solder material in the chip mount method. Here, the ribbon solder is more expensive than a thread solder. Therefore, there is a case where the manufacturing cost increases. Furthermore, when the ribbon solder is used, it is necessary to select one having a width and a thickness which are suitable for a mounting portion of a semiconductor chip. Therefore, it is necessary to manage plural kinds of ribbon solders. Accordingly, management of the solder material may be complicated in some cases. Therefore, there is a possibility that a mistake occurs in a mounting work of the solder material. Furthermore, there is also a possibility that an increase of inventory occurs.

As a method of reducing the manufacturing cost, it is conceivable to manufacture a ribbon solder by using a thread solder which is more inexpensive than the ribbon solder. Here, according to a method disclosed in Patent Literature 1, a ribbon solder having a thin ribbon-like shape is formed from one thin solder wire. Therefore, it may be difficult to increase the width and thickness of the ribbon solder.

The present invention has been made to solve the foregoing problem, and has an object to provide a method of manufacturing a plate-shaped solder and a manufacturing device of a plate-shaped solder that is easy to be changed in shape.

Solution to Problem

A method of manufacturing a plate-shaped solder according to the invention of the present application includes an aggregating step of aggregating a plurality of thread solders and a crimping step of crimping the plurality of aggregated thread solders to one another to form a plate-shaped solder.

A manufacturing device of a plate-shaped solder according to the invention of the present application includes an aggregating portion for aggregating a plurality of thread solders and a crimping portion for crimping the plurality of thread solders to one another in the aggregating portion to form a plate-shaped solder.

Advantageous Effects of Invention

In the method of manufacturing a plate-shaped solder according to the invention of the present application, plural thread solders are aggregated to form a plate-shaped solder. By changing the number of thread solders to be aggregated, the shape of the plate-shaped solder can be easily changed.

The manufacturing device of a plate-shaped solder according to the present invention aggregates plural thread solders to form a plate-shaped solder. Therefore, by changing the number of thread solders to be aggregated, the shape of the plate-shaped solder can be easily changed.

DESCRIPTION OF EMBODIMENTS

A method of manufacturing a plate-shaped solder and a manufacturing device according to an embodiment of the present invention are described with reference to drawings. Identical or corresponding constitutional elements are given

First Embodiment

Figure 1:
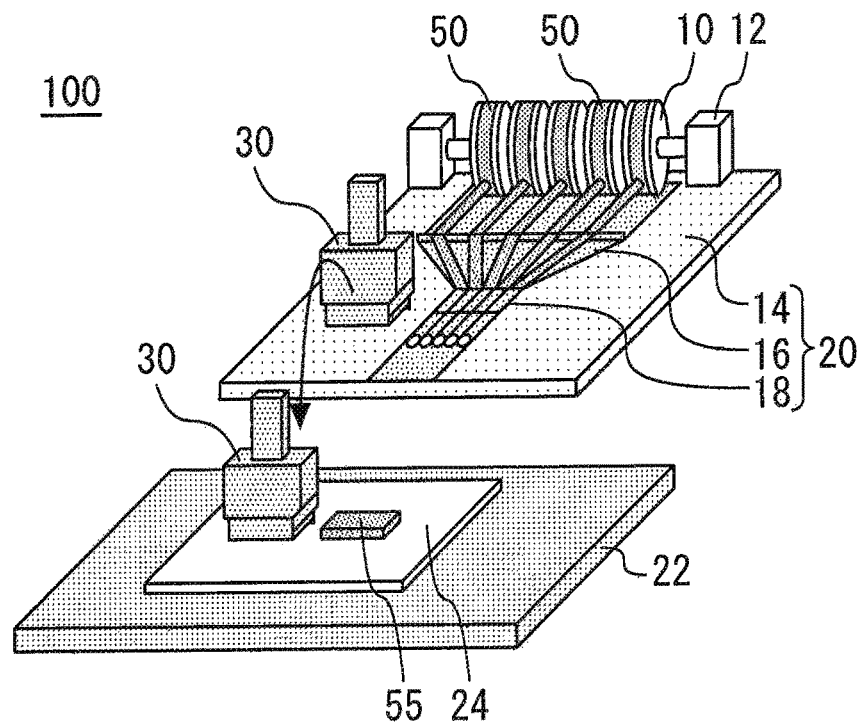
FIG. 1 is a perspective view of a manufacturing device of a plate-shaped solder according to a first embodiment.

FIG. 1 is a perspective view of a manufacturing device of a plate-shaped solder according to a first embodiment. The manufacturing device 100 according to the present embodiment includes plural reels 10 on which thread solders 50 are wound. The reels 10 are attached to a rotating unit 12. The rotating unit 12 rotates the reels 10. The rotating unit 12 is provided on a guide rail 14. The guide rail 14 causes the thread solders 50 drawn out from the reels 10 to flow in a rail direction.

An aggregating unit 16 is arranged on the guide rail 14. The aggregating unit 16 has a shape in which the width thereof decreases as leaving from the reels 10. The aggregating unit 16 aggregates plural thread solders 50 flowing on the guide rail 14 with no gap. Furthermore, the guide rail 14 is provided with a forming portion 18. The forming portion 18 is a region where a plate-shaped solder 55 is formed from the plural thread solders 50. The thread solders 50 are guided by the guide rail 14, passes through the aggregating unit 16 and then flow to the forming portion 18. The guide rail 14, the aggregating unit 16 and the forming portion 18 form an aggregating portion 20 for aggregating the plural thread solders 50.

The manufacturing device 100 includes a press unit 30. In the forming portion 18, the plural thread solders 50 are pressed by the press unit 30, whereby the plural thread solders 50 are crimped to one another to form the plate-shaped solder 55. In the present embodiment, the press unit 30 is a crimping portion. The plate-shaped solder 55 is mounted on a product 24. The product 24 is mounted on a product conveying rail 22. The product conveying rail 22 serves to convey the product 24.

Figure 2:
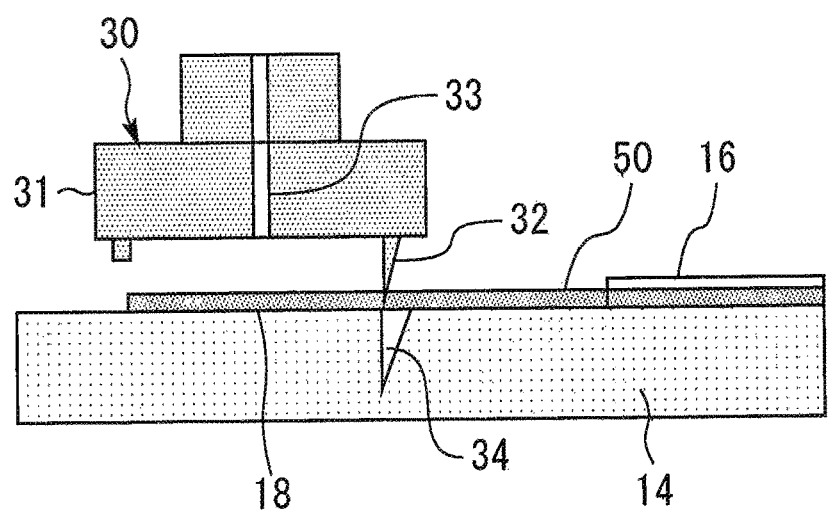
FIG. 2 is an enlarged cross-sectional view of the vicinity of a press unit and a forming portion.

FIG. 2 is an enlarged cross-sectional view of the vicinity of the press unit and the forming portion. The press unit 30 includes a cutter 32 on the lower surface of a main body portion 31. The cutter 32 cuts the plural thread solders 50. Furthermore, the press unit 30 includes a suction portion 33 for sucking the plate-shaped solder 55. The suction portion 33 includes a vacuum pipe for sucking the plate-shaped solder 55 by negative pressure. A groove 34 into which the cutter 32 intrudes when cutting the thread solders 50 is formed on the upper surface of the forming portion 18.

Next, a method of manufacturing the plate-shaped solder 55 will be described. First, an aggregating step for aggregating the plural thread solders 50 is executed. In the aggregating step, the number of thread solders 50 is first determined in conformity with the amount of solder required for mounting the semiconductor chip on the product 24. Next, the reels 10 whose number corresponds to the number of required thread solders 50 are attached to the rotating unit 12. Next, the thread solders 50 are drawn out from the reels 10. Next, the thread solders 50 are wired along the guide rail 14 to the aggregating unit 16.

Thereafter, the reels 10 are rotated to feed out the thread solders 50 to the guide rail 14. Here, the reels 10 are rotated until the thread solders 50 pass through the aggregating unit 16 and reach the forming portion 18. The intervals between the plural thread solders 50 are reduced as the thread solders 50 travel through the aggregating unit 16. The thread solders 50 that has passed through the aggregating unit 16 and reached the forming portion 18 are aggregated without any gap. Furthermore, the feed-out amount of the thread solders 50 is adjusted so that the distance from the groove 34 to the end portions of the thread solders 50 corresponds to the length of the plate-shaped solder 55.

Next, a crimping step is executed. In the crimping step, as shown in FIG. 2, the press unit 30 is first placed above the thread solders 50 so that the cutter 32 is placed above the groove 34. Next, the press unit 30 is descended by applying pressure to the press unit 30 from the upper side. At this time, the plural thread solders 50 are cut by the cutter 32. When the press unit 30 is descended further, the main body portion 31 presses the plural thread solders 50. As a result, the plural thread solders 50 are crimped to one another. At this time, the cutter 32 fits in the groove 34. From the above step, the plural thread solders 50 are press-worked, thereby forming the plate-shaped solder 55.

Next, the vacuum pipe equipped to the suction portion 33 is evacuated while the plate-shaped solder 55 is pressed. As a result, the plate-shaped solder 55 is sucked to the press unit 30. Next, as shown in FIG. 1, the press unit 30 to which the plate-shaped solder 55 has been sucked is moved to the solder mounting portion of the product 24. Next, the evacuation of the suction portion 33 is stopped. As a result, the plate-shaped solder 55 is arranged on the solder mounting portion.

In the manufacturing method and manufacturing device 100 for the plate-shaped solder 55 according to the present embodiment, the plate-shaped solder 55 can be manufactured from the thread solders 50. Therefore, the manufacturing cost can be reduced as compared with the case where the ribbon solder is used. Furthermore, by adjusting the number of the thread solders 50, the width of the plate-shaped solder 55 can be changed. Therefore, the shape of the plate-shaped solder 55 can be easily changed.

Furthermore, in the present embodiment, the plate-shaped solder 55 whose shape is matched with the shape of the solder mounting portion can be formed from the thread solders 50. Therefore, it is sufficient in an inventory management to manage the thread solders 50. Accordingly, it is possible to reduce the kinds of solder materials to be managed. As a result, management of the solder materials can be simplified, and thus mistakes in mounting work can be reduced. Moreover, it is possible to suppress an increase in inventory. Furthermore, in the present embodiment, the plate-shaped solder 55 is formed by cutting the thread solders in conformity with the shape of the solder mounting portion. Therefore, the plate-shaped solder 55 can be formed with no use of unnecessary thread solders 50.

In the present embodiment, the aggregating portion 20 aggregates the plural thread solders 50 so that the plural thread solders 50 are lined up in a row in a lateral direction. Here, the lateral direction is a direction which is perpendicular to the length direction of the thread solders 50 and is parallel to the upper surface of the guide rail 14. Here, the arrangement manner of the plural thread solders 50 may be any other manners than the foregoing manner. Although five thread solders 50 are aggregated in FIG. 1, the number of the thread solders 50 to be aggregated may be any number other than five.

Figure 3A:
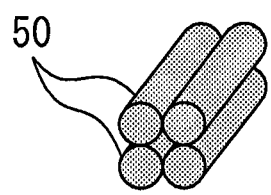
FIG. 3A is a diagram showing a method of manufacturing a plate-shaped solder according to a first modification of the first embodiment.

FIG. 3A is a diagram showing a method of manufacturing a plate-shaped solder according to a first modification of the first embodiment. As shown in FIG. 3A, the aggregating portion 20 may aggregate the thread solders 50 while stacking the thread solders 50 in a vertical direction. Here, the vertical direction is a direction perpendicular to the upper surface of the guide rail 14. In the first modification, thread solders 50 at an upper stage are arranged so as to positionally overlap thread solders 50 at a lower stage. Also, in FIG. 3A, the thread solders 50 are vertically stacked at two stages, but they may be stacked at three or more stages. Furthermore, the numbers of the thread solders 50 arranged at the upper and lower stages may be arbitrary.

Figure 3B:
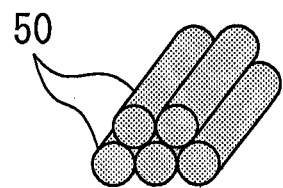
FIG. 3B is a diagram showing a method of manufacturing a plate-shaped solder according to a second modification of the first embodiment.

FIG. 3B is a diagram showing a method of manufacturing a plate-shaped solder according to a second modification of the first embodiment. As shown in FIG. 3B, the plural thread solders 50 may be positioned in a staggered arrangement. In FIG. 3B, the thread solders 50 are vertically stacked at two stages, but they may be stacked at three or more stages. Furthermore, in FIG. 3B, three thread solders 50 are arranged at the lower stage, and two thread solders 50 are arranged at the upper row, but the number of the thread solders 50 arranged at each stage may be arbitrary.

Figure 3C:
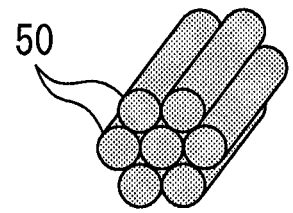
FIG. 3C is a diagram showing a method of manufacturing a plate-shaped solder according to a third modification of the first embodiment.

FIG. 3C is a diagram showing a method of manufacturing a plate-shaped solder according to a third modification of the first embodiment. As shown in FIG. 3C, plural thread solders 50 may be arranged so as to surround one thread solder 50. In the third modification, seven thread solders 50 are bundled and aggregated.

As shown in FIGS. 3A to 3C, it is possible to secure the thickness of the plate-shaped solder 55 by vertically aggregating the thread solders 50. Therefore, the thickness of the plate-shaped solder 55 can be changed by changing the stacking manner of the thread solders 50. Accordingly, in the first to third modifications, not only the width of the plate-shaped solder 55, but also the thickness thereof can be easily changed. In addition, adjacent thread solders 50 are easily bonded to each other in the crimping step by vertically stacking and aggregating the thread solders 50. Therefore, a firm plate-shaped solder 55 can be formed. Accordingly, it is possible to prevent separation between the thread solders 50 when the plate-shaped solder 55 is mounted on the product 24.

Figure 4A:
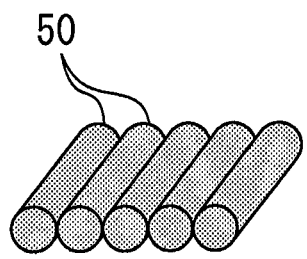
FIG. 4A is a diagram showing a method of manufacturing the plate-shaped solder according to the first embodiment.

FIG. 4A is a diagram showing a method of manufacturing the plate-shaped solder according to the first embodiment. As shown in FIG. 4A, in the first embodiment, the plural thread solders 50 of the same type are aggregated. On the other hand, thread solders of plural kinds may be aggregated to form the plate-shaped solder 55. This makes it easy to mix plural kinds of solder materials.

Figure 4B:
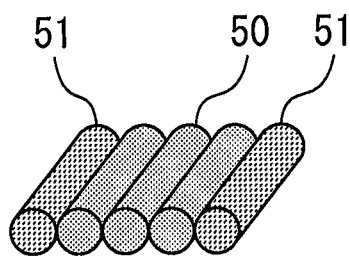
FIG. 4B is a diagram showing a method of manufacturing a plate-shaped solder according to a fourth modification of the first embodiment.

FIG. 4B is a diagram showing a method of manufacturing a plate-shaped solder according to a fourth modification of the first embodiment. In the method of manufacturing the plate-shaped solder according to the fourth modification, the thread solders 50 and thread solders 51 are aggregated. Here, the thread solders 51 are formed of a material different from that of the thread solders 50. The thread solders 51 have a melting point higher than that of the thread solders 50. Here, the thread solders 51 having the higher melting point are arranged outside. This makes it possible to form a joint surface which relaxes stress from the outside. As a result, it is possible to stabilize the joint between the semiconductor chip and the product 24 and prolong the product age. Accordingly, the reliability of the product 24 can be enhanced.

Figure 4C:
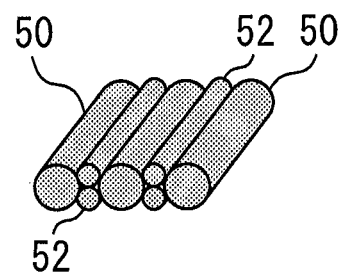
FIG. 4C is a diagram showing a method of manufacturing a plate-shaped solder according to a fifth modification of the first embodiment.

FIG. 4C is a diagram showing a method of manufacturing a plate-shaped solder according to a fifth modification of the first embodiment. In the method of manufacturing a plate-shaped solder according to the fifth modification, the thread solders 50 and thread solders 52 are aggregated. Here, the thread solders 52 have a wire diameter different from that of the thread solders 50. The thread solders 52 have a smaller wire diameter than that of the thread solders 50. Two thread solders 52 are arranged between the thread solders 50 while stacked vertically. By combining the thread solders 50 and 52 having different wire diameters, it is possible to form a plate-shaped solder 55 having a size and a thickness which are suitable for a solder mounting portion.

When the ribbon solder is used as a solder material, a ribbon solder to be used is required to be selected from a material having a width and a thickness which are suitable for the solder mounting region. Therefore, options of the ribbon solder are limited. Accordingly, it may be sometimes difficult to obtain a ribbon solder having characteristics suitable for a product specification. On the other hand, in the present embodiment, as shown in the fourth and fifth modifications, it is possible to easily mix plural kinds of thread solders. Therefore, the degree of freedom of characteristics such as the melting point and the shape of the plate-shaped solder 55 is enhanced. Accordingly, it is possible to obtain a plate-shaped solder 55 suitable for the product specification.

These modifications can be applied, as appropriate, to a method of manufacturing a plate-shaped solder and a manufacturing device according to the following embodiments. Note that the method of manufacturing the plate-shaped solder and the manufacturing device according to the following embodiments are similar to those of the first embodiment in many respects, and thus differences between the method of manufacturing the plate-shaped solder and the manufacturing device according to the following embodiments and those of the first embodiment will be mainly described below.

Second Embodiment

Figure 5:
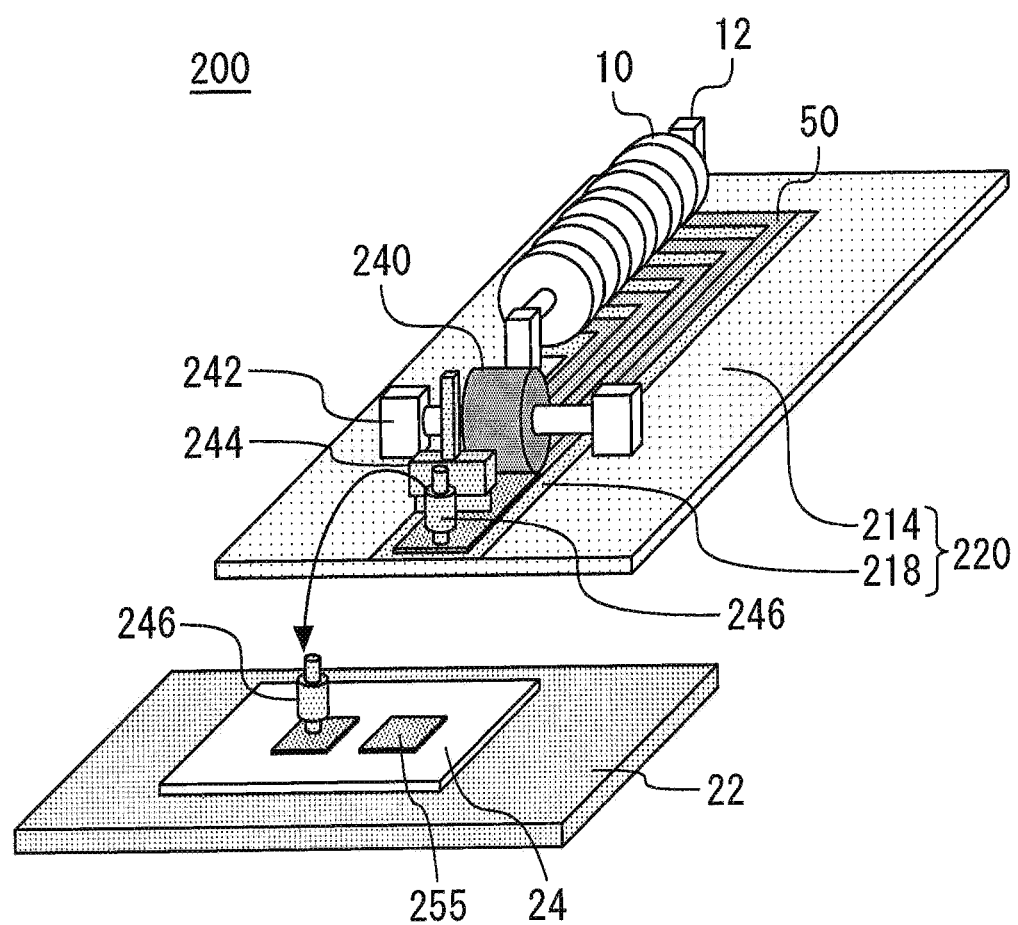
FIG. 5 is a perspective view of a manufacturing device of a plate-shaped solder according to a second embodiment.

FIG. 5 is a perspective view of a manufacturing device of a plate-shaped solder according to a second embodiment. The manufacturing device 200 according to the present embodiment includes a guide rail 214. The thread solders 50 drawn out from the reels 10 flow while being guided by the guide rail 214. The thread solders 50 drawn out from the reels 10 travel straightly in a draw-out direction. Thereafter, the guide rail 214 crooks each thread solder 50 at a right angle. At this time, the guide rail 214 crooks each thread solder 50 so that the thread solder 50 is in contact with thread solders 50 adjacent thereto. The crook of each thread solder 50 at the right angle allows the plural thread solders 50 to be arranged without any gap. As a result, the plural thread solders 50 are aggregated.

A rotating unit 242 is arranged on the guide rail 214. A roller 240 is attached to the rotating unit 242. The rotating unit 242 rotates the roller. A forming portion 218 is formed on the guide rail 214 on an opposite side to the reel 10 with respect to the roller 240. The forming portion 218 is a region where a plate-shaped solder 255 is formed from the plural thread solders 50. The guide rail 214 and the forming portion 218 form an aggregating portion 220 for aggregating the plural thread solders 50.

The thread solders 50 are guided by the guide rail 214 and pass under the roller 240. At this time, the aggregated thread solders 50 are rolled by the roller 240. As a result, the plate-shaped solder 255 is formed from the plural thread solders 50. In the present embodiment, the roller 240 is a crimping portion. The manufacturing device 200 includes a cutter 244. The cutter 244 cuts the plate-shaped solder 255 in the forming portion 218. Furthermore, the manufacturing device 200 includes a suction unit 246. The suction unit 246 sucks the plate-shaped solder 255.

Next, a method of manufacturing the plate-shaped solder 255 according to the present embodiment will be described. First, an aggregating step is carried out. The method of manufacturing the plate-shaped solder 255 according to the present embodiment is the same as the first embodiment up to a step of drawing out the thread solders 50 from the reels 10. Thereafter, the thread solders 50 are wired on the guide rail 214. Next, the reels 10 are rotated so that the thread solders 50 are caused to flow along the guide rail 214. Each thread solder 50 is crooked at a right angle by the guide rail 214. As a result, the plural thread solders 50 are aggregated without any gap.

Here, the roller 240 is kept to be rotated. Next, the thread solders 50 pass under the roller 240. At this time, the thread solders 50 are subjected to rolling processing by the roller 240. As a result, the plural thread solders 50 are crimped to one another to form the plate-shaped solder 255. In the present embodiment, the step of rolling the thread solders 50 is a crimping step.

The plate-shaped solder 55 formed by the roller 240 reaches the forming portion 218. Next, in the forming portion 218, the plate-shaped solder 255 is cut by the cutter 244. Next, the cut plate-shaped solder 255 is sucked by the suction unit 246. Next, the suction unit 246 is moved to the solder mounting portion of the product 24, and the plate-shaped solder 255 is mounted on the product 24.

The manufacturing devices 200 according to the present embodiment aggregates the plural thread solders 50 by crooking the path of the thread solders 50 at a right angle. Therefore, the aggregating unit 16 is unnecessary. Accordingly, the manufacturing device 200 can be formed with a simple structure. Furthermore, in the present embodiment, the thread solders 50 pass under the roller 240, whereby the plural thread solders 50 are crimped to one another. Therefore, a press-working step is unnecessary. Accordingly, the plate-shaped solder 255 can be formed in a shorter time than that in the first embodiment.

Third Embodiment

Figure 6:
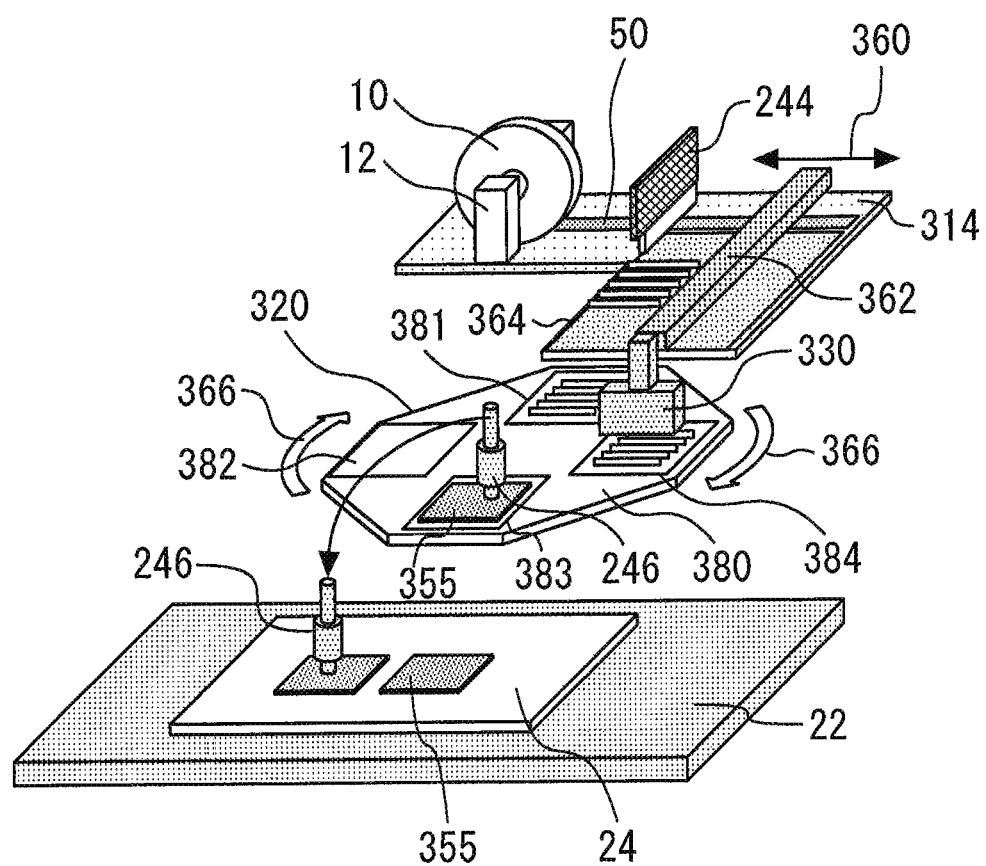
FIG. 6 is a perspective view of a manufacturing device of a plate-shaped solder according to a third embodiment.

FIG. 6 is a perspective view of a manufacturing device of a plate-shaped solder according to a third embodiment. The manufacturing device 300 according to the present embodiment includes one reel 10 on which the thread solder 50 is wound. The reel 10 is attached to the rotating unit 12. The rotating unit 12 is provided on a guide rail 314. The thread solder 50 drawn from the reel 10 is guided to travel straightly by the guide rail 314. A cutter 244 is provided between the reel 10 and an end portion of the thread solder 50 drawn from the reel 10. The cutter 244 cuts the thread solder 50.

The manufacturing device 300 includes an adjustment portion 362 on the guide rail 314. The adjustment portion 362 can be moved in a direction indicated by an arrow 360. The thread solder 50 flows to a position where the end portion thereof is in contact with the side surface of the adjustment portion 362. Therefore, the adjustment portion 362 determines the distance between the cutter 244 and the end portion of the thread solder 50. Accordingly, by changing the position of the adjustment portion 362, the length of the thread solder 50 to be cut out can be changed.

Moving unit 364 is provided between the cutter 244 and the adjustment portion 362. The moving unit 364 moves the end portion side of the cut-out thread solder 50 to the aggregating portion 320. In the present embodiment, the moving unit 364 is a conveyor.

The aggregating portion 320 includes a rotary table 380. The rotary table 380 has a first pocket 381, a second pocket 382, a third pocket 383 and a fourth pocket 384 on the upper surface thereof. Any one of the first to fourth pockets 381 to 384 is supplied with the thread solder 50 from the moving unit 364. The first to fourth pockets 381 to 384 are provided so that the thread solders 50 are aggregated without any gap.

The rotary table 380 rotates in a direction indicated by an arrow 366, whereby the pocket to which the thread solder 50 is supplied can be changed. Furthermore, the pocket in which the thread solders 50 are aggregated is placed under a press unit 330. The plural thread solders 50 are pressed by the press unit 330. As a result, the plural thread solders 50 are crimped to one another to form the plate-shaped solder 355. In the present embodiment, the press unit 330 is a crimping portion. As the rotary table 380 further rotates, the plate-shaped solder 355 is placed at the lower side of the suction unit 246. The plate-shaped solder 355 is sucked by the suction unit 246 and mounted on the product 24.

Next, a method of manufacturing the plate-shaped solder 355 according to the present embodiment will be described. First, the position of the adjustment portion 362 is adjusted so that the length between the cutter 244 and the adjustment portion 362 is equal to the length of the plate-shaped solder 355. Next, the thread solder 50 is drawn out from the reel 10. Thereafter, the thread solder 50 is wired on the guide rail 314. Next, the reel 10 is rotated to cause the thread solder 50 to flow along the guide rail 314. Here, the thread solder 50 is caused to flow until the end portion of the thread solder 50 comes into contact with the side surface of the adjustment portion 362.

The thread solder 50 is cut out by the cutter 244 at the time when the end portion of the thread solder 50 comes into contact with the side surface of the adjustment portion 362. The cut-out thread solder 50 is moved to the aggregating portion 320 by the moving unit 364. Next, the thread solder 50 is caused to flow again until the end portion of the thread solder 50 comes into contact with the side surface of the adjustment portion 362. Subsequently, cutting, moving and flowing of the thread solder 50 are repeated. As a result, the cut-out thread solder 50 continues to be supplied to the aggregating portion 320.

Under an initial state, the first pocket 381, the second pocket 382, the third pocket 383, and the fourth pocket 384 are set to be empty. Furthermore, the first pocket 381 is placed at a position where the cut-out thread solders 50 are delivered from the moving unit 364. Therefore, the thread solder 50 is supplied from the moving unit 364 to the first pocket 381.

When a specified number of thread solders 50 are aggregated in the first pocket 381, the rotary table 380 rotates in a direction indicated by an arrow 366. As a result, the second pocket 382 is placed at a position where the thread solders 50 are delivered from the moving unit 364. Furthermore, the first pocket 381 is placed under the press unit 330. In the first pocket 381, the plural thread solders 50 are pressed by the press unit 330. As a result, the plate-shaped solder 355 is formed. In the present embodiment, the step in which the plural thread solders 50 aggregated in any of the first to fourth pockets 381 to 384 are press-worked is a crimping step. While the specified number of thread solders 50 are aggregated in the second pocket 382, the press-working is performed in the first pocket 381.

When a specified number of thread solders 50 are aggregated in the second pocket 382, the rotary table 380 rotates again. As a result, the third pocket 383 is placed at a position where the thread solders 50 are delivered from the moving unit 364. Also, the second pocket 382 is placed under the press unit 330. Furthermore, the first pocket 381 is placed under the suction unit 246. In the first pocket 381, the plate-shaped solder 355 is sucked by the suction unit 246 and mounted on the product 24. As a result, the first pocket 381 becomes empty. Here, while the specified number of thread solders 50 are aggregated in the third pocket 383, the press-working and the mounting onto the product 24 are performed in the first pocket 381 and the second pocket 382.

When the specified number of thread solders 50 are aggregated in the third pocket 383, the rotary table 380 rotates again. As a result, the fourth pocket 384 is placed at a position where the thread solders 50 are delivered from the moving unit 364. Also, the third pocket 383 is placed under the press unit 330. Furthermore, the second pocket 382 is placed under the suction unit 246. Here, while the specified number of thread solders 50 are aggregated in the fourth pocket 384, the press-working and the mounting onto the product 24 are performed in the second pocket 382 and the third pocket 383.

When the specified number of thread solders 50 are aggregated in the fourth pocket 384, the rotary table 380 rotates again. As a result, the first pocket 381 is placed at a position where the thread solders 50 are delivered from the moving unit 364. Also, the fourth pocket 384 is placed under the press unit 330. Furthermore, the third pocket 383 is placed under the suction unit 246. The second pocket 382 is empty. Here, while the specified number of thread solders 50 are aggregated in the first pocket 381, the press-working and the mounting onto the product 24 are performed in the third pocket 383 and the fourth pocket 384. From the above step, as the rotary table 380 repeats rotation, the plate-shaped solder 355 is continuously formed and supplied to the product 24.

In the present embodiment, the step of aggregating the cut-out thread solders 50 in any one of the first to fourth pockets 381 to 384 is the aggregating step. In the present embodiment, prior to the aggregating step, one thread solder 50 is cut to form the plural thread solders 50. Therefore, the plate-shaped solder 355 can be formed with one reel 10. Therefore, the amount of the thread solder 50 used by the manufacturing device 300 can be reduced. Furthermore, the length of the plate-shaped solder 355 can be easily changed by the adjustment portion 362.

Furthermore, in the present embodiment, the thread solders 50 can be aggregated by arranging the thread solders 50 in the pockets equipped to the rotary table 380. Therefore, it is possible to easily realize an arrangement shown in FIGS. 3A to 3C in which the thread solders 50 are vertically stacked. Furthermore, it is possible to easily realize an arrangement shown in FIGS. 4B and 4C in which the plural types of thread solders are mixed. From the above step, the degree of freedom of arrangement of the plural thread solders 50 is increased, and the number of the kinds of plate-shaped solders 355 can be increased.

In the present embodiment, it is assumed that the rotary table 380 has four pockets. However, the number of pockets may be any number other than four insofar as the rotary table 380 has plural pockets. For example, when the number of pockets is two, the press-working and the mounting onto the product 24 are performed in the second pocket 382 while the specified number of thread solders 50 are aggregated in the first pocket 381.

Furthermore, the press unit 330 and the suction unit 246 may be integrated with each other. In this case, at the same time when the plural thread solders 50 are pressed by the press unit 330 to form the plate-shaped solder 355, the plate-shaped solder 355 is sucked by the suction unit 246, and moved to the solder mounting portion.

Furthermore, the manufacturing device 300 according to the present embodiment includes one reel 10. In contrast, the manufacturing device 300 may include plural reels 10. In this case, the plural reels 10 are attached to the rotating unit 12 to be arranged side by side. The plural thread solders 50 drawn from the plural reels 10 extend in parallel to one another up to the adjustment portion 362. The cutter 244 simultaneously cuts the plural thread solders 50 extending from the plural reels 10. As a result, plural cut-out thread solders 50 can be simultaneously formed. Therefore, it is possible to shorten a period for which a specified number of thread solders 50 are aggregated.

Note that the technical features described in the above embodiments may be combined as appropriate.

REFERENCE SIGNS LIST 100,200,300 manufacturing device, 50,51,52 thread solder, 55,255,355 plate-shaped solder, 20,220,320 aggregating portion, 30,330 press unit, 32,244 cutter, 33 suction portion, 10 reel, 364 moving unit, 362 adjustment portion, 381 first pocket, 382 second pocket, 380 rotary table, 240 roller

The invention claimed is:

1. A method of manufacturing a plate-shaped solder comprising:
    aggregating a plurality of thread solders one after the other in a lateral direction on a surface parallel with the lateral direction; and
    crimping the plurality of aggregated thread solders while positioned one after the other in a lateral direction on the surface to one another to form a plate-shaped solder, wherein
    crimping includes performing press-working on the plurality of thread solders using a press unit,
    the press unit includes a cutter for cutting the plurality of thread solders, and
    the cutter is provided on a surface to contact with the plurality of thread solders, of the press unit.

2. The method of manufacturing a plate-shaped solder according to claim 1,
    further comprising cutting a thread solder to form the plurality of thread solders, prior to the aggregating.

3. The method of manufacturing a plate-shaped solder according to claim 1, wherein
    the plurality of thread solders are vertically stacked and aggregated in the aggregating.

4. The method of manufacturing a plate-shaped solder according to claim 1, wherein
    the plurality of thread solders include a plurality of types of thread solders formed from different materials.

5. The method of manufacturing a plate-shaped solder according to claim 1, wherein
    the plurality of thread solders include a plurality of types of thread solders having different wire diameters.

6. A manufacturing device of a plate-shaped solder comprising:
    an aggregating portion configured to aggregate a plurality of thread solders one after the other in a lateral direction on a surface of the aggregating portion parallel with the lateral direction; and
    a crimping portion configured to crimp the plurality of thread solders while positioned one after the other in a lateral direction on the surface of the aggregating portion to one another to form a plate-shaped solder, wherein
    the crimping portion includes a press unit configured to press the plurality of thread solders,
    the press unit includes a cutter for cutting the plurality of thread solders, and the cutter is provided on a surface to contact with the plurality of thread solders, of the press unit.

7. The manufacturing device of a plate-shaped solder according to claim 6, wherein
the press unit includes a suction portion for sucking the plate-shaped solder.

8. A manufacturing device of a plate-shaped solder comprising:
an aggregating portion for aggregating a plurality of thread solders;
a crimping portion for crimping the plurality of thread solders to one another in the aggregating portion to form a plate-shaped solder and including a press unit for pressing the plurality of thread solders;
a reel around which a thread solder is wound;
a cutter that is provided between the reel and an end portion of the thread solder extending from the reel and cuts the thread solder; and
moving unit for moving an end portion side of the cut thread solder to the aggregating portion.

9. The manufacturing device of a plate-shaped solder according to claim 8, further comprising
an adjustment portion for determining a distance between the cutter and the end portion of the thread solder.

10. The manufacturing device of a plate-shaped solder according to claim 8, wherein
the aggregating portion includes a rotary table having a first pocket and a second pocket,
the first pocket is placed at a position where the thread solder is delivered from the moving unit, and
when the plurality of thread solders are aggregated in the first pocket, the rotary table is rotated, the first pocket is placed under the press unit, and the second pocket is placed at a position where the thread solder is delivered from the moving unit.

11. The manufacturing device of a plate-shaped solder according to claim 6, wherein
the aggregating portion aggregates the plurality of thread solders while vertically stacking the plurality of thread solders.

12. The manufacturing device of a plate-shaped solder according to claim 6, wherein
the plurality of thread solders include a plurality of types of thread solders formed from different materials.

13. The manufacturing device of a plate-shaped solder according to claim 6, wherein
the plurality of thread solders include a plurality of types of thread solders having different wire diameters.

* * * * *